United States Patent
Truesdell et al.

(10) Patent No.: US 12,168,149 B2
(45) Date of Patent: Dec. 17, 2024

(54) FALL ARRESTER

(71) Applicant: Buckingham Manufacturing Company, Inc., Binghamton, NY (US)

(72) Inventors: Kevin W. Truesdell, Binghamton, NY (US); James J. Rullo, Binghamton, NY (US)

(73) Assignee: Buckingham Manufacturing Company, Inc., Binghamton, NY (US)

( * ) Notice: Subject to any disclaimer, the term of this patent is extended or adjusted under 35 U.S.C. 154(b) by 0 days.

(21) Appl. No.: 15/280,098

(22) Filed: Sep. 29, 2016

(65) Prior Publication Data

US 2019/0060683 A1 Feb. 28, 2019

Related U.S. Application Data

(60) Provisional application No. 62/234,330, filed on Sep. 29, 2015.

(51) Int. Cl.
| | |
|---|---|
| A62B 35/00 | (2006.01) |
| A62B 1/14 | (2006.01) |
| B61H 9/02 | (2006.01) |
| E06C 7/18 | (2006.01) |
| F16D 63/00 | (2006.01) |

(52) U.S. Cl.
CPC ............ *A62B 35/0081* (2013.01); *A62B 1/14* (2013.01); *B61H 9/02* (2013.01); *E06C 7/18* (2013.01); *E06C 7/186* (2013.01); *F16D 63/008* (2013.01)

(58) Field of Classification Search
CPC ...... A62B 35/0081; E06C 7/18; F16D 63/008
See application file for complete search history.

(56) References Cited

U.S. PATENT DOCUMENTS

| | | | | |
|---|---|---|---|---|
| 3,348,632 | A * | 10/1967 | Swager | E06C 7/187 182/36 |
| 5,238,084 | A * | 8/1993 | Swager | E06C 7/187 182/8 |
| 5,577,576 | A * | 11/1996 | Petzl | A62B 1/14 188/65.4 |
| 6,155,384 | A * | 12/2000 | Paglioli | A62B 1/14 188/65.5 |
| 7,108,099 | B2 * | 9/2006 | Ador | A62B 1/14 182/5 |

(Continued)

FOREIGN PATENT DOCUMENTS

| | | | | |
|---|---|---|---|---|
| CA | 2951471 A1 * | 12/2015 | ............... | A62B 1/14 |
| DE | 202017101379 U1 * | 7/2017 | | |

(Continued)

*Primary Examiner* — Gregory J Strimbu
(74) *Attorney, Agent, or Firm* — Bond, Schoeneck & King, PLLC; Frederick J. M. Price

(57) ABSTRACT

A fall arrester used by utility linemen, communications and telecommunication workers that comprises a body defined by a pair of spaced apart frame members bridged by a floor, and a cam pivotally mounted to the body and sandwiched between the frame members. The cam includes teeth formed on its cam end and an eye formed at the end of the lever end. A carabiner or other connector is connected to the device through the eye and can be attached to the climber's full body harness. A rope passes between the frame members and between the cam and floor of the body.

2 Claims, 7 Drawing Sheets

(56) References Cited

U.S. PATENT DOCUMENTS

| | | | | |
|---|---|---|---|---|
| 8,348,016 B2 * | 1/2013 | Lewis | ............... | A62B 1/14 |
| | | | | 182/5 |
| 8,454,832 B2 | 6/2013 | Hamad et al. | | |
| 8,464,832 B1 * | 6/2013 | Rullo | ............. | A62B 35/0075 |
| | | | | 182/5 |
| 2006/0070809 A1 * | 4/2006 | Barzilai | ............. | E06B 7/28 |
| | | | | 182/5 |

FOREIGN PATENT DOCUMENTS

| WO | WO-2015074105 A1 * | 5/2015 | ............ | A62B 1/14 |
|---|---|---|---|---|
| WO | WO-2016131092 A1 * | 8/2016 | ............ | A62B 1/14 |

* cited by examiner

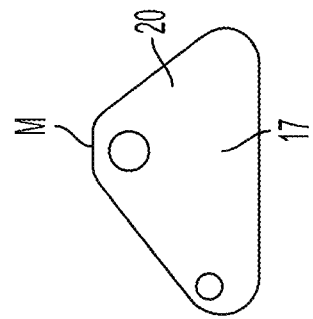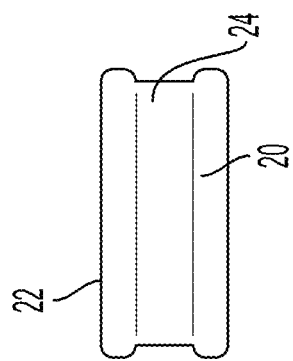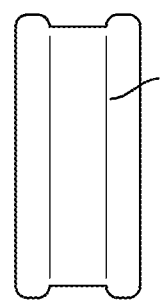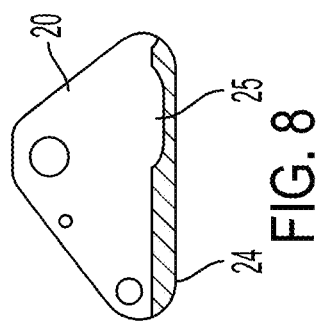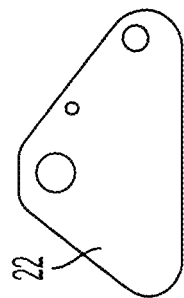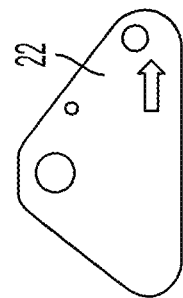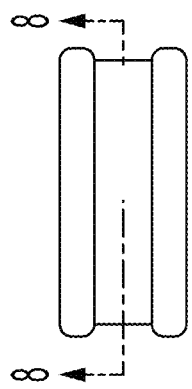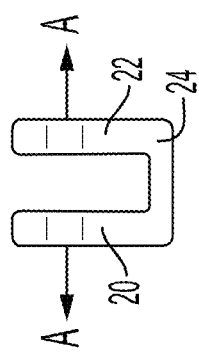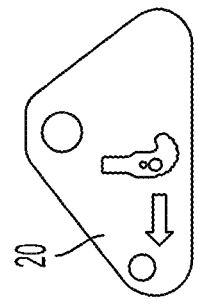

FALL ARRESTER

REFERENCE TO RELATED APPLICATION

The present application relates and claims priority to U.S. Provisional Application Ser. No. 62/234,330, filed Sep. 29, 2015, the entirety of which is hereby incorporated by reference.

BACKGROUND

1. Field of Invention

The present invention relates generally to devices for arresting falls, and more particularly to fall arresters used by utility linemen, communications and telecommunication workers when climbing towers, ladders, or utility poles.

2. Background of Art

Fall arresters are used by climbers to stop a free fall. The fall arresting device generally comprises a toothed cam pivotally sandwiched opposed sides of a body. A rope passes between the plates and beneath the toothed cam such that it is pinched by the teeth of the cam if downward pressure is applied to the cam lever, which pulls the teeth into biting engagement with the rope. The cam lever is tethered to the climber by a carabiner or other connector. Thus, if the climber falls off the climbing apparatus or surface, the cam lever will be pulled downwardly as the climber falls. This downward pressure applied to the cam lever causes the teeth of the cam to rotate into biting relation with the rope that is securely tied off to a stable point, thereby arresting the fall.

When used properly, fall arresters work well to prevent a dangerous free fall. However, if the rope begins to fray, it is possible that the cam won't adequately engage the rope when needed, thereby not preventing the free fall. In addition, because movement of the climber up the ladder causes the device to pivot, it is necessary for the climber to hold the fall arrester in one hand and keep the cam from engaging the rope so that it travels along the rope with the ascending climber.

3. Objects and Advantages

It is a principal object and advantage of the present invention to provide a fall arrester that enhances the safety features of fall arresters by making it unlikely that a frayed rope slips through the cam.

It is another object and advantage of the present invention to provide a cam stop that permits the climber to ascend without having to adjust the fall arrester to permit it to travel up the rope.

Other objects and advantages of the present invention will in part be obvious and in part appear hereinafter.

SUMMARY OF THE INVENTION

In accordance with the foregoing objects and advantages, the present invention provides a fall arrester used by utility linemen, communications and telecommunication workers that comprises a body defined by a pair of spaced apart frame members bridged by a floor, and a cam pivotally mounted to the body and sandwiched between the frame members. The cam includes teeth formed on its cam end and an eye formed near the end of the lever end. A carabiner or other connector is connected to the device through the eye and can be attached to the climber's full body harness. A rope passes between the frame members and between the cam and floor of the body. As the cam lever is forced downwardly (e.g., via the climber falling which causes the carabiner to transfer the force of the fall to the cam lever), the teeth of the cam are brought into engaged and biting relation to the rope causing the device to stop moving along the rope and, in turn, causing the climber's fall to also cease and the climber to be, in essence, suspended from the rope by the fall arrester.

BRIEF DESCRIPTION OF THE DRAWINGS

The present invention will be more fully understood and appreciated by reading the following Detailed Description in conjunction with the accompanying drawings, in which:

FIG. 7 is a top plan view of the frame;

FIG. 8 is a cross-sectional view of the frame taken along section line 8-8 of FIG. 7;

FIG. 9 is side elevation view of the frame;

FIG. 10 is a front elevation view of the frame;

FIG. 11 is a side elevation view of the frame;

FIG. 12 is a bottom plan view of the frame;

FIG. 13 is a side elevation view of the frame;

FIG. 14 is a side elevation view of the frame;

FIG. 15 is a bottom plan view of the frame;

DETAILED DESCRIPTION

Figure 1:
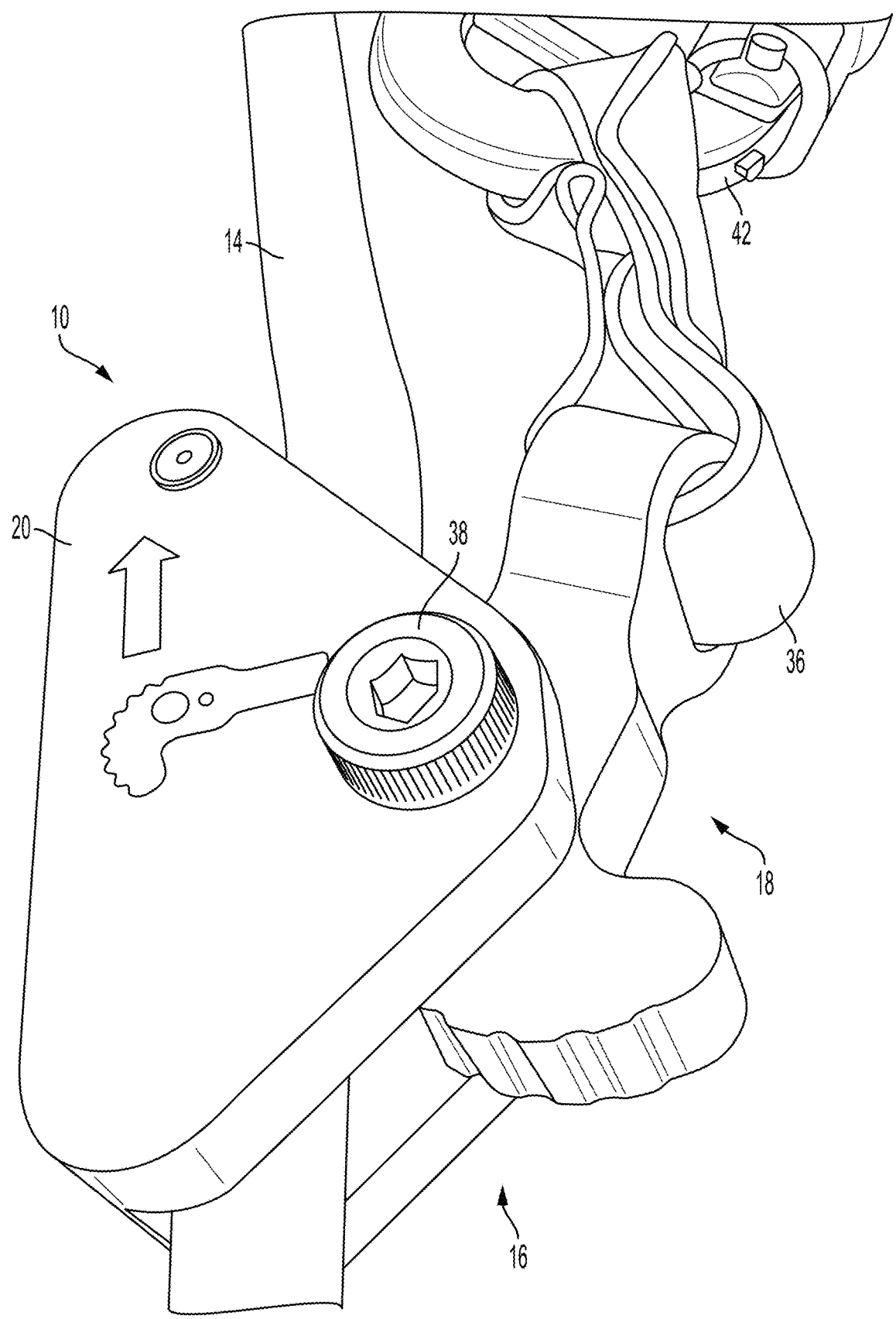
FIG. 1 is a close up perspective view of the fall arrester of the present invention attached to a rope.
Figure 1A:
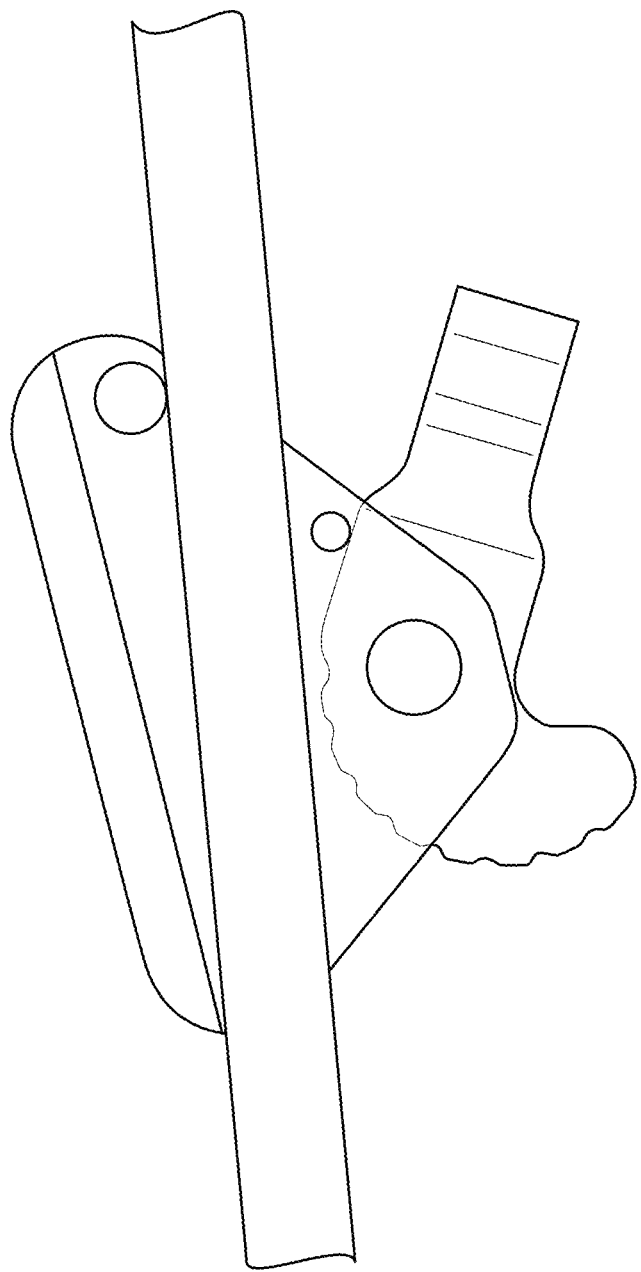
Figure 2:
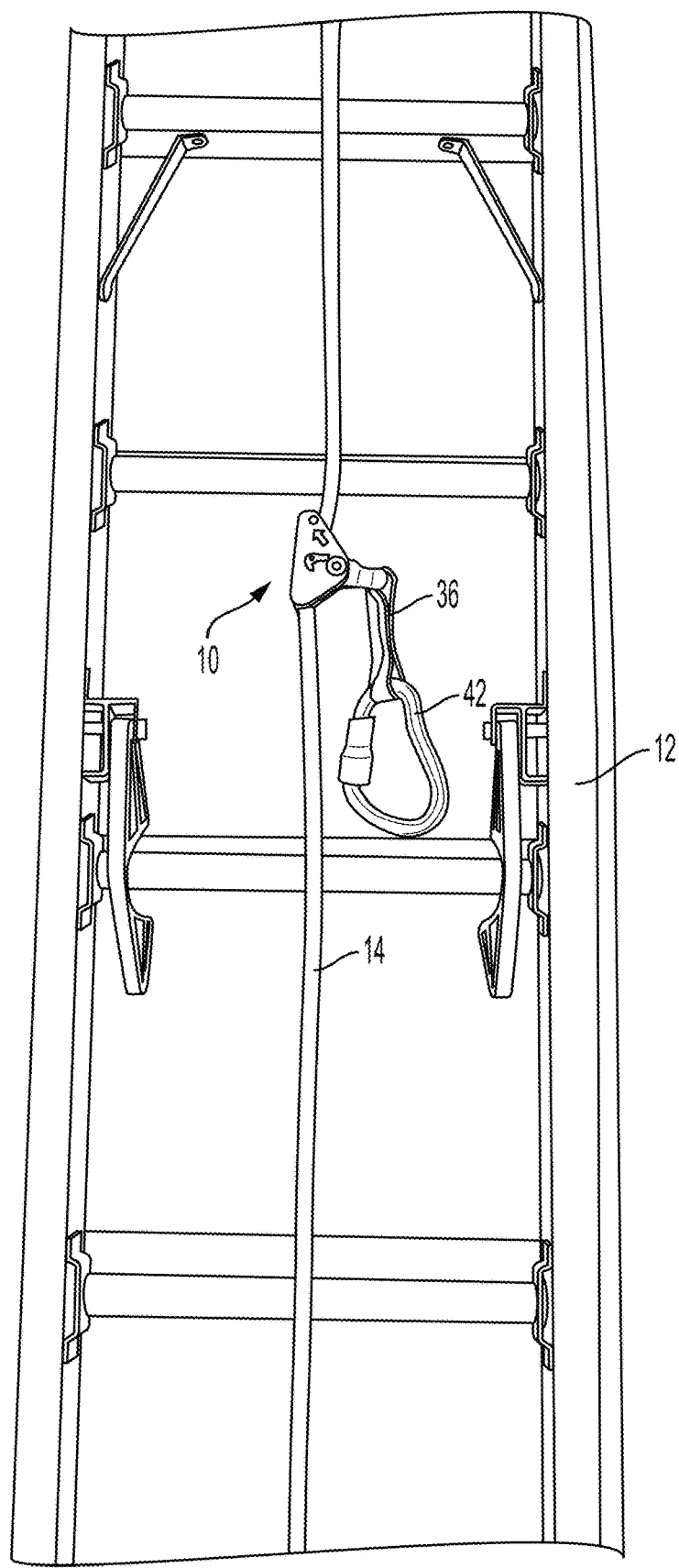
FIG. 2 is a front elevation of the fall arrester of the present invention on a rope that is fixed to a ladder.
Figure 3:
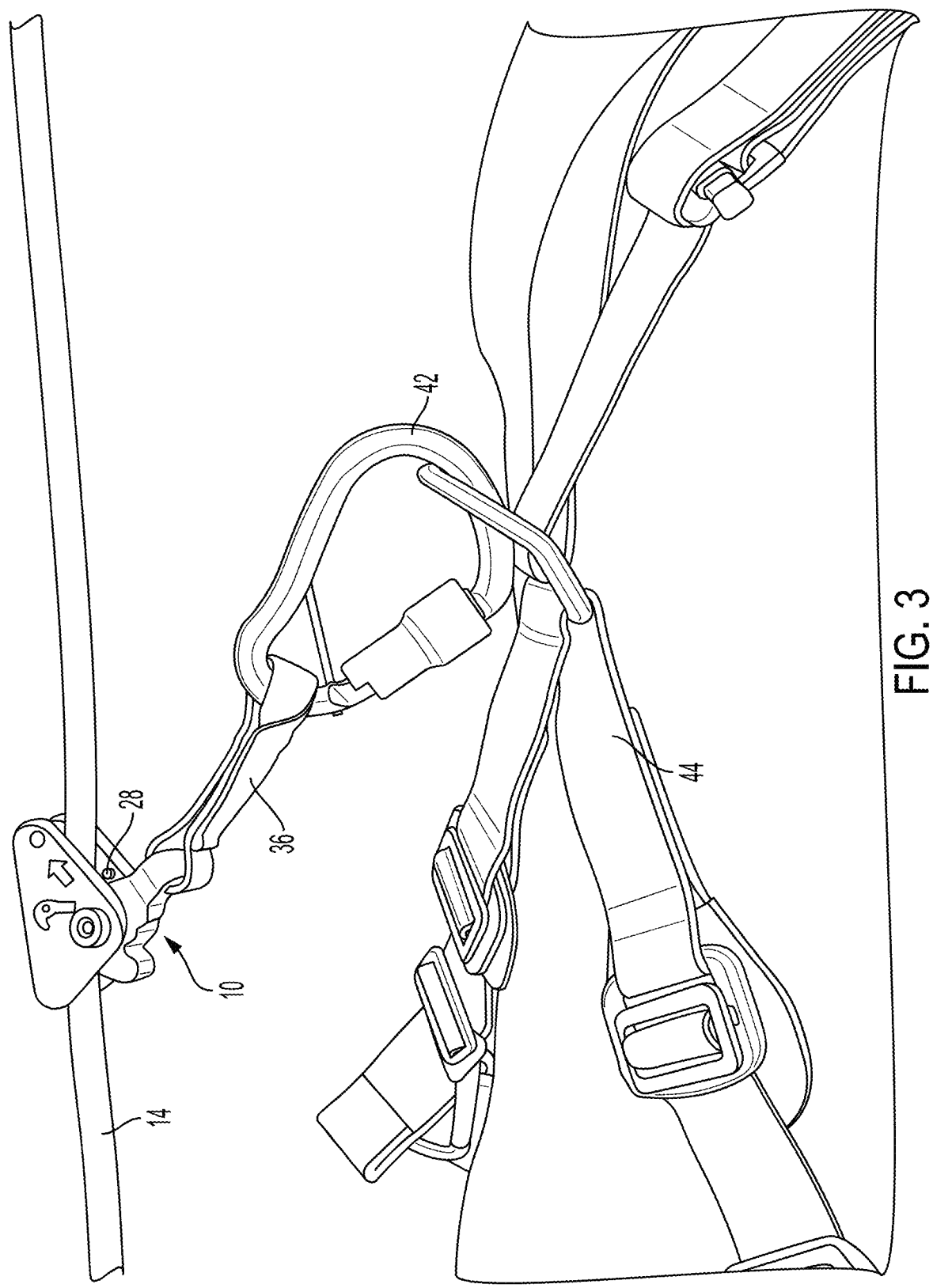
FIG. 3 is a perspective view of the fall arrester of the present invention tethered between a rope and a full body harness.
Figure 6:
FIG. 6 is an enlarged, partial side elevation view of the cam lever.
Figure 5:
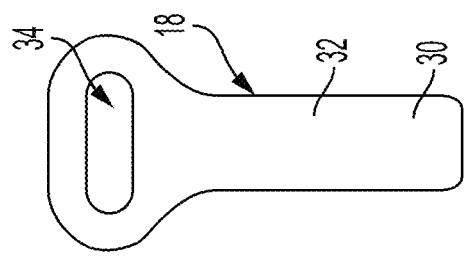
FIG. 5 is a front elevation view of the cam lever.
Figure 4:
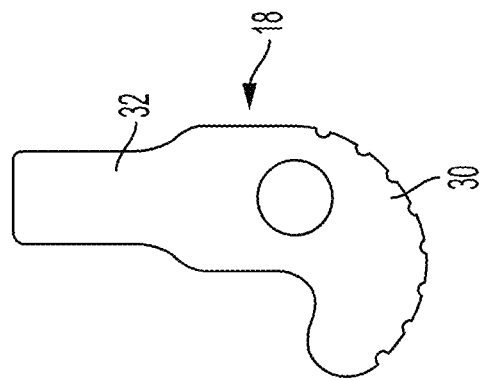
FIG. 4 is a side elevation view of the cam lever.
Figure 16:
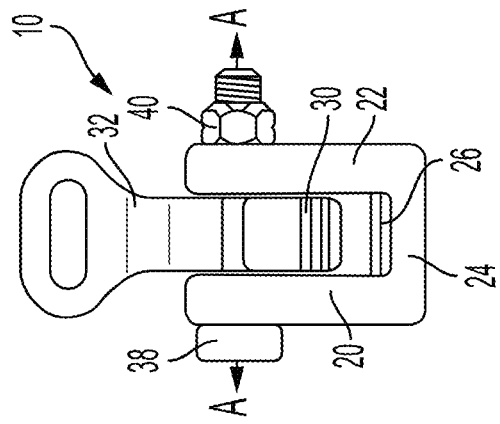
FIG. 16 is a side elevation view of the fall arrester.
Figure 17:
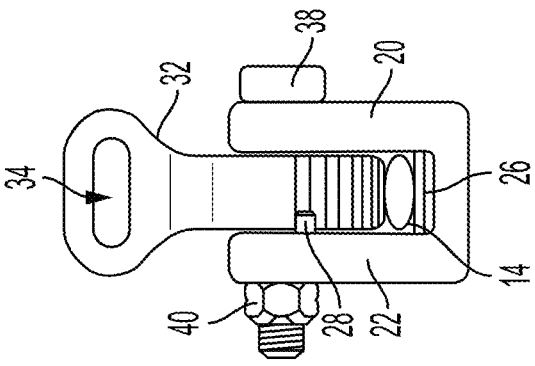
FIG. 17 is a front elevation view of the fall arrester.
Figure 18:
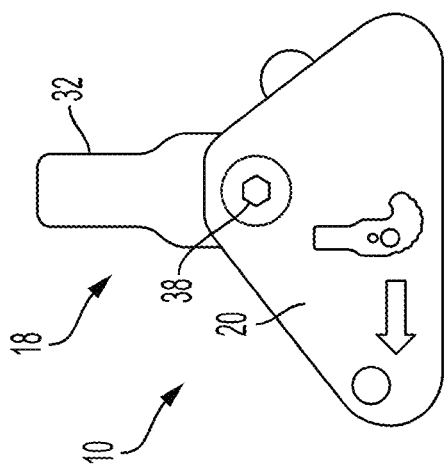
FIG. 18 is a side elevation view of the fall arrester.
Figure 19:
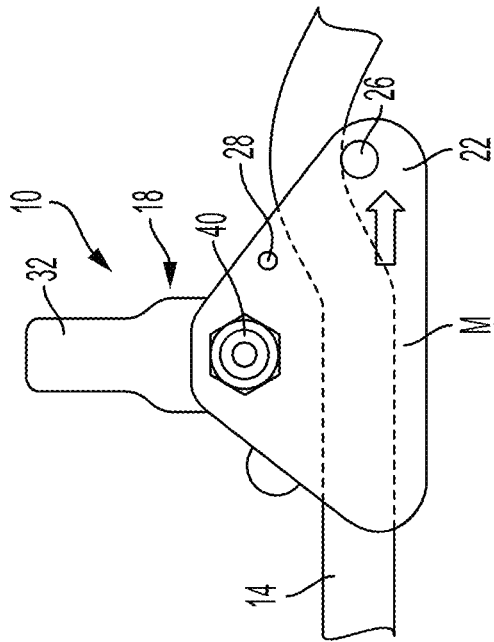
FIG. 19 is a rear elevation view of the fall arrester.

Referring now to the drawings, wherein like reference numerals refer to like parts throughout, there is seen a fall arrester designated generally by reference numeral 10 that is used by a climber when climbing a ladder 12 or other structure that will assist in preventing the climber from free falling to the ground. More specifically, in the event a climber falls from a ladder or other structure, fall arrester 10 which is tethered to the climber will engage a rope (or webbing) 14 that is stably secured to the top of the ladder 12 or other structure arresting the climber's fall and suspending him or her from the ladder 12 or other structure until he or she can recover or be rescued by another person.

Fall arrester 10 generally comprises a frame 16 and a cam 18 pivotally connected to frame 16. In operation, a rope (or webbing) 14 is securely tied off to the top of a ladder 12 or other climbing structure and dangles therefrom. The rope 14 is passed through the frame 16 such that the cam 18 can engage and pinch the rope 14 when a downward force is applied to the cam 18. Such downward force is supplied when a climber falls from the ladder 12 in light of the fall arrester 10 being tethered to him or her. Thus, when a climber falls from ladder 12, cam 18 is pivoted within frame 16 such that it engages and pinches rope 14 causing the climber's descent to cease.

Frame 16 comprises a pair of opposed sidewalls 20, 22 that are maintained in spaced parallel relation to one another by a floor 24 that includes a slight dipped section 25 at an intermediate position there along to accommodate cam 18. A pair of pins 26, 28 extends at least partially and transversely across and between sidewalls 20, 22. Pin 26 (e.g., a "rope pin") extends fully between sidewalls 20, 22 and is positioned adjacent floor 24 and at the top end of fall arrester 10 (the "top end" being defined as the end of the device that is positioned at the top when the device is in use). As the rope 14 passes between sidewalls 20, 22 and between cam 18 and floor 24, it also passes over pin 26 to raise it a slight distance above floor 24. Thus, when cam 18 pivots and engages rope 14, the slight raising of rope 14 off floor 24 permits a more stable grab of the rope by the cam. Thus, pin 28 adds a further safety feature to fall arrester 10 by making it more effective on even frayed ropes or webbing.

Pin 28 (e.g., a "stop pin") is integrated with the sidewall and positioned adjacent to the pivot axis A-A of cam 18 and just to the top side of the midpoint M of fall arrester 10. When a climber is ascending ladder 12, the stop pin 28 prevents the cam from over-rotating and engaging the cam with the rope, thereby permitting the device to move freely up the rope as the climber ascends.

Cam 18 comprises a toothed, curved cam end 30 positioned between sidewalls 20, 22, and an elongate lever 32 that extends from cam end 30 out of frame 16 terminating in an eye 34 to which a lanyard 36 is attached. Eye 34 extends in a plane that is transverse to the planes in which sidewalls 20, 22 extend, and is oval in shape to accommodate both web based and rope based lanyards. A shoulder bolt 38 passes through sidewalls 20, 22 and cam 18 at about the intersection of cam end 30 and lever 32 and is fastened by a lock nut 40. Cam 18 pivots about shoulder bolt 38.

In an alternate embodiment of the fall arrester, stop pin 28' is integrated with and extends directly from cam 18, as opposed to the sidewall. Pin 28' otherwise acts the same as pin 28.

In assembling fall arrester 10, cam 18 is placed between sidewalls 20, 22 such that the free end of cam end 30 extends towards the bottom end of fall arrester 10, as most clearly seen in FIG. 7. Lanyard 36 extends to a carabineer 42 that attaches to a climber's full body harness 44 to tether fall arrester 10 to the climber. If a climber were to fall from ladder 12, the cam 18 would pivot about bolt 38 and the teeth formed on cam end 30 would bite into rope 14. It should be pointed out that the distance separating the bottom of cam end 30 from floor 24 is less than the thickness of rope 14, thus causing the teeth to bite into the rope 14 as it pivots about bolt 38.

What is claimed is:

1. A fall arrester, comprising:
   a frame comprising first and second sidewalls held in spaced parallel relation to one another by a floor;
   a cam pivotally connected to said frame and having a toothed cam end positioned between said first and second sidewalls and a cam lever extending from a cam end and out of said frame;
   a channel located between the floor and the cam for receiving a rope between the floor and the cam;
   an eye in the lever, the eye extending in a plane that is transverse to a plane of the first sidewall and a plane of the second sidewall;
   a stop pin extending at least partially between said first and second sidewalls and in a pivot path of said cam, wherein the cam is configured to contact the stop pin to create a spaced relationship between the cam and the rope when the cam is in a first position, wherein the cam is pivotally movable between at least the first position wherein the toothed cam end does not contact the rope located in the channel when the cam is in engagement with the stop pin and a second position wherein the toothed cam end engages the rope located in the channel based on a force exerted on the lever in a direction substantially parallel to the floor when the floor is extending in a substantially vertical direction; and
   a rope pin extending between said first and second sidewalls, and extending in a plane between the toothed cam end and said floor wherein the floor adjacent to the rope pin extends along a single plane from a first end to a second end of the floor and between the first sidewall and the second sidewall, further wherein the rope pin is configured to raise the rope above the floor when the rope extends between the first and second sidewalls.

2. The fall arrester of claim 1, wherein said stop pin is integrated with said first sidewall in a one-piece construction.

* * * * *